US007177819B2

(12) United States Patent
Muncaster et al.

(10) Patent No.: US 7,177,819 B2
(45) Date of Patent: Feb. 13, 2007

(54) WIRELESS INTELLIGENT REAL ESTATE ELECTRONIC LOCK BOX

(75) Inventors: George William Muncaster, Phoenix, AZ (US); William Bryan Austin, Chandler, AZ (US); Guy George Romano, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 63 days.

(21) Appl. No.: 10/658,046

(22) Filed: Sep. 9, 2003

(65) Prior Publication Data

US 2004/0049406 A1 Mar. 11, 2004

Related U.S. Application Data

(63) Continuation of application No. 09/602,340, filed on Jun. 24, 2000, now Pat. No. 6,624,742.

(51) Int. Cl.
*G06F 17/60* (2006.01)
*G06F 7/04* (2006.01)

(52) U.S. Cl. ............................. 705/1; 340/5; 340/825

(58) Field of Classification Search ................ 705/1; 70/63; 340/5
See application file for complete search history.

(56) References Cited

U.S. PATENT DOCUMENTS 4,766,746 A * 8/1988 Henderson et al. ........ 340/5.73
4,800,255 A * 1/1989 Imran ....................... 235/382
5,046,084 A * 9/1991 Barrett et al. .......... 379/102.06
5,654,696 A * 8/1997 Barrett et al. ............. 340/5.33
5,791,172 A * 8/1998 Deighton et al. ............. 70/63
5,793,882 A * 8/1998 Piatek et al. ............... 382/115
6,472,973 B1 * 10/2002 Harold et al. ............. 340/5.73

FOREIGN PATENT DOCUMENTS

WO   WO 008705069 A1 *  8/1987

OTHER PUBLICATIONS

Supra Introduces new eKEY Portable, Digital Organizer To Enhance REALTOR Professionalism And Pruductivity, Nov. 1, 1999, printed from www.geindustrial.com.*

* cited by examiner

*Primary Examiner*—Naresh Vig
(74) *Attorney, Agent, or Firm*—Hisashi D. Watanabe

(57) ABSTRACT

An intelligent real estate system including an intelligent real estate sign having embedded processing functionality and a wireless communication device capable of receiving wireless electronic queries and programming instructions and for communicating with local and remote information sources about a real estate property and with controlling agents for reporting status. Further included is an electronic lock box controlling access to the real estate property and having an embedded wireless communication device capable of receiving messages and control signals from the real estate sign and from a property owner/occupant and/or real estate agents for reporting status. An earth battery may also be included, at least partially contained within the real estate sign and supplying power to the real estate sign.

13 Claims, 3 Drawing Sheets

WIRELESS INTELLIGENT REAL ESTATE ELECTRONIC LOCK BOX

RELATED APPLICATIONS

This is a continuation of U.S. application Ser. No. 09/602,340, filed Jun. 24, 2000, now U.S. Pat. No. 6,624,742.

FIELD OF THE INVENTION

The present invention relates to an intelligent real estate sign and electronic lock box to enhance information delivery, collection, use, and the security of real estate properties.

BACKGROUND OF THE INVENTION

The current method of marketing real estate property for sale is labor intensive and necessarily results in significant variation in the quality and timeliness of information transfer between the property seller, the seller's agent and the prospective buyers.

"For Sale By Owner" and other methods of selling real estate which do not involve formal and substantive real estate agent involvement are susceptible to significant confusion, lost time, legal and other difficulties inherent in satisfactory execution of a sale. Such methods can potentially expose both the seller and the buyer to significant risks and legal liabilities.

Traditional real estate signs serve only to direct prospective buyers to a single real estate office or agent. Such "For Sale" properties can only be investigated during certain (e.g., daylight, agency office, etc.) hours and such appointments must most often be scheduled ahead of time through the buyer's agent and/or the property occupants. This is especially problematical when property offered for sale is unoccupied, located in rural areas, or is otherwise distant or requires significant travel time from the listing real estate office. Further, property visits are documented only by agents leaving their business cards and visit durations are usually undeterminable. Such information may materially assist in achieving a rapid sale satisfactory to all parties. Since interactions between the seller and potential buyer are traditionally discouraged, potential buyer comments, impressions and criticisms about the property are rarely relayed to the seller. Additionally, there is no record of entries to/exits from the property, nor of specific points of entry used (e.g., front door, sliding door, garage door, external basement entrance, window, etc.), regardless of how many entrances, exits, or transits of the property are made during a visit. Thus, no method of tracking activity at the property is ordinarily at hand today other than the presence of a business card voluntarily left by a visiting agent.

In addition, updated information concerning a specific property, for example, the presence of an offer and its status, schedules for showing the property, changes in price or terms, etc., is typically available only through agent request (i.e., "pull") or agent-mediated buyer request (i.e., "pull"), as opposed to via network-mediated automatic notifications (i.e., "push") to agents and also simultaneously to potential buyers.

In addition to these limitations of the current real estate business model, the security of a property listed for sale is often compromised by the placement of a mechanical real estate lock box on one or more points of access on the property. Such prior art lock boxes operate via a common physical key or spin dial combination distributed to many agents and boxes are reused among properties offered for sale. Such factors compromise the security of the real estate property.

In light of the foregoing limitations of the prior art real estate selling methods, there is clearly a need for an intelligent real estate system to promote communication of information between the seller and other interested parties (e.g., agents, occupants, potential buyers) to enhance the overall effectiveness and security of the property.

BRIEF DESCRIPTION OF THE DRAWINGS

The features of the present invention that are believed to be novel are set forth with particularity in the appended claims. However, the invention together with further advantages thereof, may be best understood by reference to the accompanying drawings wherein:

DETAILED DESCRIPTION OF THE PREFERRED EMBODIMENT

Figure 1:
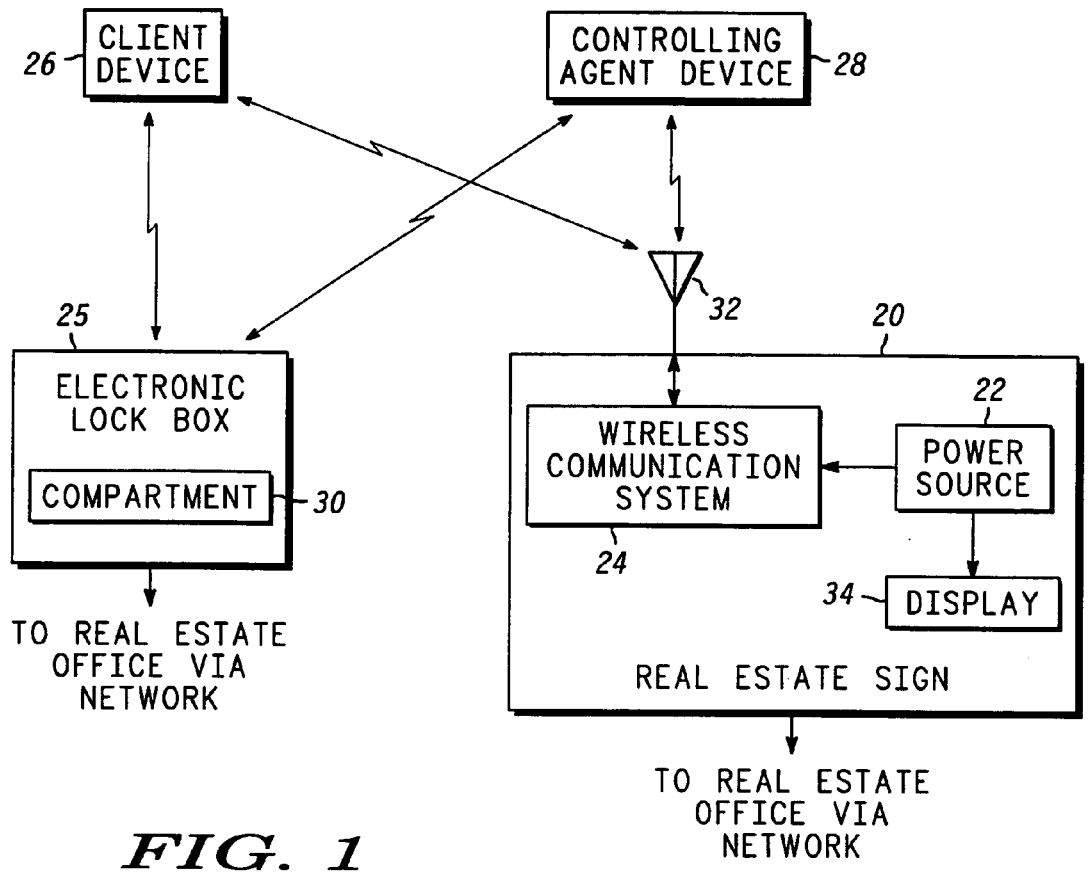
FIG. 1 is a diagram showing the overall intelligent real estate system according to an embodiment of the present invention.

The present invention relates to an intelligent real estate system to enhance and speed up the process of selling real estate property. FIG. 1 is a diagram showing the overall intelligent real estate system according to an embodiment of the present invention. Referring to FIG. 1, a typical real estate sign 20 is preferably powered by a power source 22 and has a wireless communication system 24 attached thereto. Wireless communication system 24 is also preferably powered by power source 22 to communicate with, for example, an electronic lock box 25, a client device 26 and/or a controlling agent device 28. Client device 26 and controlling agent device 28 are preferably wireless devices, such as a personal digital assistant, a cellular phone, a digital wallet, etc., which are compatible with wireless communication system 24 and are capable of input/output, information storage and display. Client device 26 will typically be carried by either a potential buyer or a non-controlling real estate agent, such as the potential buyer's agent. Client device 26 is typically limited to interactively communicating with either real estate sign 20 or electronic lock box 25 to exchange information. Client device 26 will typically be unable to control access to the property. Additionally, client device 26 may access the Internet or an agency network for the purpose of on-line, real-time loan application and decision making; locations of comparable properties; access to public government databases, such as to query real estate title, assessments, liens, zoning, easements, permit history, improvement records, etc.

To provide marketing information and to provide information on potential buyers (which might for example, assist in screening qualifiable prospects for a particular property from others, etc.), real estate sign 20 can preferably record and store the identity, contact time(s), information and action requests made by potential buyers and agents.

Controlling agent device 28 will typically have additional capabilities not realized by client device 26, as controlling agent device 28 is preferably carried only by the agent listing the real estate property. Such additional device 28 capabilities are addressed below in more detail. Wireless communication system 24 will be discussed later in detail with reference to FIG. 2.

Real estate sign 20 is also intended to perform all of the physical/mechanical functions performed by a traditional real estate sign, e.g., fixed, visual display of agency, contact information, summary status (e.g., "sold", "sale pending", "reduced", etc.). The sign is also intended to incidentally host a box or other container for holding paper flyer sheets, etc., relating to property features useful for communicating basic property information to persons not possessing any kind of portable client device 26 capable of communicating electronically with real estate sign 20. In a preferred embodiment, real estate sign 20 is a typical real estate sign, which is placed, for example, in front of a house for sale. As stated above, power source 22 may be attached to real estate sign 20 or embedded therein, either partially or completely. Although any type power source may be used, in a preferred embodiment of the present invention, power source 22 is an earth battery.

An earth battery operates in a manner similar to a conventional battery and generates electrical energy from an electrochemical reaction of the electrodes of the battery and the earth. The use of an earth battery in this application is particularly beneficial because most often a real estate sign is located on a front yard of the property offered for sale. Such a location is usually removed from ordinary commercial electrical power sources. In addition, the power to a property listed for sale may be turned off if the occupant has already vacated the premises. The use of a solar powered battery may also be problematic depending on the area surrounding the real estate sign.

Therefore, in order to provide sufficient power to real estate sign 20, an earth battery constructed of separate and modular anode and cathode subsystems with materials selected for their electronic properties and also to local soil properties and other characteristics preferably may be used to provide in-situ electrical power tailored to the real estate system requirements. Anode and cathode materials can be fashioned, for example, into plates, rods, or other two or three dimensional shapes as needed to ensure an effective and, if need be, customized intelligent real estate system installation.

Considerations of factors including soil conditions, power quantity and quality requirements, soil penetration ability, minimal required lifetime and other such factors are preferably considered in conjunction with the earth battery. Electrode subsystems may be designed to be attached to electrical transmission wires which terminate in and provide electrical power to real estate sign 20 (not shown).

Electrodes may be located within or at the periphery of the signpost, or may be detached for separate placement and connected by electrical wiring suitable for conducting electricity to the sign. Electrodes integral to the sign may be inserted into the ground at the time the signpost is installed. Electrodes may be separately inserted into the ground and their attached wiring then attached to the sign in a separate process. Electrodes are preferably buried in the soil while electrical transmission wires are preferably concealed within real estate sign 20. Electrode components may be selectively and modularly connected together in series and/or parallel, as necessary, to provide power of the proper current and voltage to actuate all sign functions. Thus, the real estate sign installer will preferably select the anode and cathode materials and form factors as needed for the intended site. Preferably, physical access to power source 22 is also provided. In the event an interruptible power source is used (e.g., solar photovoltaic power), a backup battery is incorporated to support memory retention while the standard battery is changed is preferably incorporated into electronic lock box 25 (not shown).

Electronic lock box 25 may typically be an all-electronic lock box which is wireless. Optionally, electronic lock box 25 may be networked. Electronic lock box 25, according to the present invention, also can be a dual-mode lock box, which is similar to current mechanical lock boxes in that once electronic lock box 25 is opened, a key stored therein can be accessed. It should be noted that the key may be a traditional mechanical key or any type device capable of providing access through one or more entry ways at the property. However, if the real estate property is of a type having electronic capabilities, e.g., electronic locks, electronic lock box 25 may typically be all electronic and preferably may control entry to the real estate property through one or more entryways. It should also be noted that electronic lock box 25 can typically perform all functions that a standard prior art lock box can perform.

Electronic lock box 25 is preferably hermetically sealed such that it is waterproof with no external penetration points, slots, etc., which would support prying or other such physical attacks which compromise the security of the real estate property. If electronic lock box 25 is of a type having mechanical lock box functions, internal compartment 30 may preferably accommodate one or more keys. In addition, electronic lock box 25 typically includes a clock, a local nonvolatile memory, a proximity device reader, a user display, and preferably is compatible with electronic cards, such as a smart card. Preferably, the real estate sign 20 can perform all of the information exchanges, as discussed above, which electronic lock box 25 can perform.

To provide marketing information and to record how long the agent and/or potential buyer spent inside the real estate property, electronic lock box 25 can preferably record and store the duration of each visit to the real estate property. For properties possessing indigenous electronic networking capabilities (e.g., preexisting security system, home data network, etc.), each use of a property entry-point (e.g., front door, sliding door, garage door, external basement entrance, window, etc.) can be recorded and stored for later retrieval and audit purposes.

In addition, the identity of the agent who showed the house and the time and duration of each visit during which the electronic lock box was utilized while the house was shown can also typically be recorded. Optionally, electronic lock box 25 can function in a manner similar to wireless communication system 24 by supporting user queries and supplying information wirelessly to either client 26 or controlling agent device 28.

Preferably, electronic lock box 25 can accommodate an alarm system which is triggered by an unauthorized attempt to access the property. Additionally, emergency alarms generated by an appropriately interfacing wireless personal electronic device 26 or 28 can be recorded, stored, and forwarded by electronic lock box 25 and/or real estate sign 20 to one or more externally networked service agencies, including the listing real estate office and/or public safety agencies. A long-life type battery is typically attached to electronic lock box 25 to support all internal electronic functions and, similarly, a backup battery supporting memory retention while the standard battery is changed is preferably incorporated into electronic lock box 25 (not shown).

In a preferred embodiment, controlling agent device 28 can directly control electronic locks without interfacing with electronic lock box 25. Electronic lock box 25 alternatively can be accessible mechanically to accommodate users not equipped with a portable wireless device. However, electronic lock box 25 can preferably still record any mechanical access events and attempts. Typically, various control standards can be maintained through electronic lock box 25 by scheduling times of the day which access may be granted, either pre-programmed or controllable by the property owner/occupant.

In a preferred embodiment of the present invention, access to the electronic lock box support functions can be reserved, via an electronic security device, to the controlling agent, other agents authorized by the listing real estate office, users authorized via network registration from other offices of the listing enterprise, etc.

Electronic lock box 25 may be optionally networked with a real estate network infra-structure through on premises network access points, such as an owner/occupant supplied telephone line or stand-alone wireless networking access provided by the real estate network. Real estate sign 20 also may be networked in a similar fashion and may be used in conjunction with more than one property.

In a preferred embodiment, an antenna 32 may be placed somewhere about real estate sign 20. Alternatively, any other similar device may be used in place of antenna 32. The placement of antenna 32 preferably may be arranged to protect antenna 32 from the environment.

An electronically activated display 34 may be optionally included on real estate sign 20 to display dynamic information supplementing physical/mechanical signage functions pertaining to the real estate property, such as square footage, availability for touring, etc. Electronic display 34 and wireless communication system 24 can each sequentially present sale-relevant information, such as "Sale Pending", "Price Reduced", "Additional Favorable Terms Offered by Seller", etc. Such information can also be displayed on controlling agent device 28 or client device 26.

Figure 2:
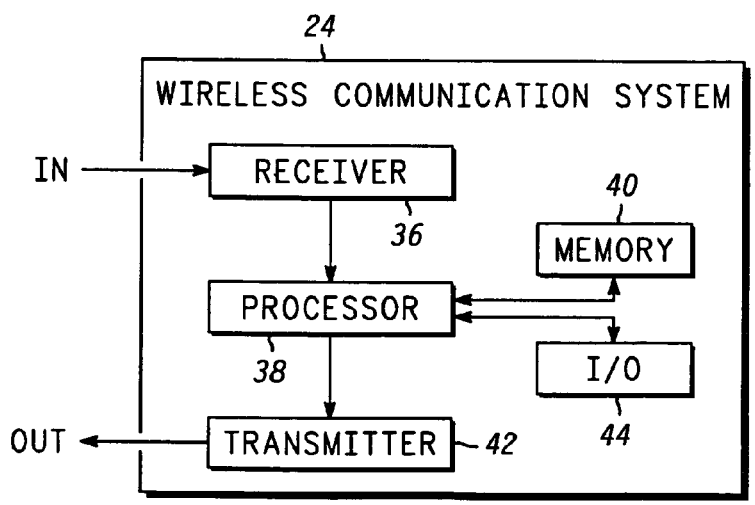
FIG. 2 is a more detailed diagram showing the overall components of a wireless communication system embedded in a real estate sign according to the present invention.

FIG. 2 is a more detailed diagram showing the overall components of a wireless communication system embedded in a real estate sign according to the present invention. Referring now to FIG. 2, wireless communication system 24 is preferably a short-range wireless system. Wireless communication system 24 may include a receiver 36, a processor 38, a memory 40 and a transmitter 42. When a request for information is received from either controlling agent device 28, client device 26, or lock box 25, the request is preferably processed by processor 38. Processor 38 preferably accesses memory 40 to fetch the requested information and transmits the information, as appropriate, via transmitter 42. As previously stated, wireless communication system 24 is preferably powered by power source 22, as shown in FIG. 1. Wireless communication system 24 may operate in standalone mode or in concert with other wireless short-range devices, including electronic lock box 25.

Wireless communication system 24 may support such features as, for example, recording feedback concerning the property from an agent and/or potential buyers. Further, a buyer's agent or a prospective buyer may post private messages, comments and questions directly to the seller or seller's agent. Such messages may include, but are not limited to, suggestions for making the property show better, for example. In addition, in a preferred embodiment of the present invention, wireless communication system 24 may record specific questions about the property which are distinct from the stored types of information available via wireless communication system 24. Inputs to wireless communication system 24 may be made via voice (voice mail) or input electronically, for example via I/O 44.

Wireless communication system 24 would typically be able to log and transmit occupant messages, such as those relating to scheduling and showing the property. For example, the occupant may log and transmit a message such as "Do Not Disturb" if the occupant is temporarily unavailable to receive visits. The occupant may typically use any device capable of communicating with wireless communication system 24, including a client device 26, a controlling agent device 28, or a compatible commercial device, such as a cellular telephone or wireless modem, to log such messages.

Wireless communication system 24 can preferably provide a virtual tour, for example, of the real estate property. This virtual tour preferably allows a client to navigate via appropriate data links to information of interest to potential buyers, including graphical images with accompanying narration relevant to the various rooms of the property, noteworthy items of décor, landscaping features, property improvements, specific appliances or other furnishings whose ownership will or will not be included with the sale of the property. Additional useful information, such as the formal property description recorded with the relevant municipal or other governmental entity; title/ownership records, easements, covenants/restrictions, etc. conveyed with the property and binding on the buyer; school/taxation district levies; property improvement permit histories; etc., may be requested by a client device 26 or controlling agent device 28 and retrieved by real estate sign 20. In addition, receiver 36 of wireless communication system 24 can preferably receive and store information about the potential buyer such as, for example, contact information or a request for additional information made by the potential buyer. Typically, receiver 36 can receive information about any visitor to the property who was carrying any client device 26 or compatible device.

Memory 40 preferably stores records of significant information and events such as agent and potential buyer identifications, information requests, successful and unsuccessful access attempts and the length of each visit to the property, for example.

Preferably, receiver 36 is capable of receiving information from client device 26 or controlling agent device 28. Such information can typically include, but is not limited to, requests for standard property listing information, requests to view the property, owner/occupant "in" or "out" status, owner/occupant current entry preferences (e.g., "Enter Please", "Do Not Disturb", etc.). Examples of data conditionally available to seller's agent may include records of accesses granted and accesses refused, visits made inside the property with identities of agents (and of appropriately equipped potential buyers, the length of visits and other significant events.

As stated previously, controlling agent device 28 is typically provided with capabilities which extend beyond the capabilities of client device 26. Such additional capabilities include, but are not limited to, Enabling, (re)programming, and disabling the real estate sign 20 and electronic lock box 25;

Enhanced access permissions for entering the property (e.g., override time of day, etc., restrictions customarily in effect for all client device 26 holders;

Viewing and/or downloading information stored by real estate sign 20 and electronic lock box 25;

Interacting with other premises electronic equipment, such as alarm systems, watering systems, electronic appliances, etc., as necessary;

Performing diagnostic actions, preventive and corrective system maintenance functions, and summoning personnel for performing detailed maintenance beyond the scope of agent functions.

When client or agent queries require the accessing of for-fee databases (e.g., certain municipal or other government jurisdictions) or operating via fee-based services of a third-party provider (title search firm, loan qualifier, value-added data services, etc.), wireless communication system 24 is preferably capable of accepting and processing queries and payments.

An additional preferred capability provided by the present invention is the ability to distribute monetary incentives to agents for specified, measurable actions, such as showing the most properties, spending the longest amount of time in the properties, showing the property to pre-qualified buyers, spending at least a minimum amount of time inside the property, etc. Such incentives typically may be individually established, monitored and concluded on a property-by-property basis.

Figure 3:
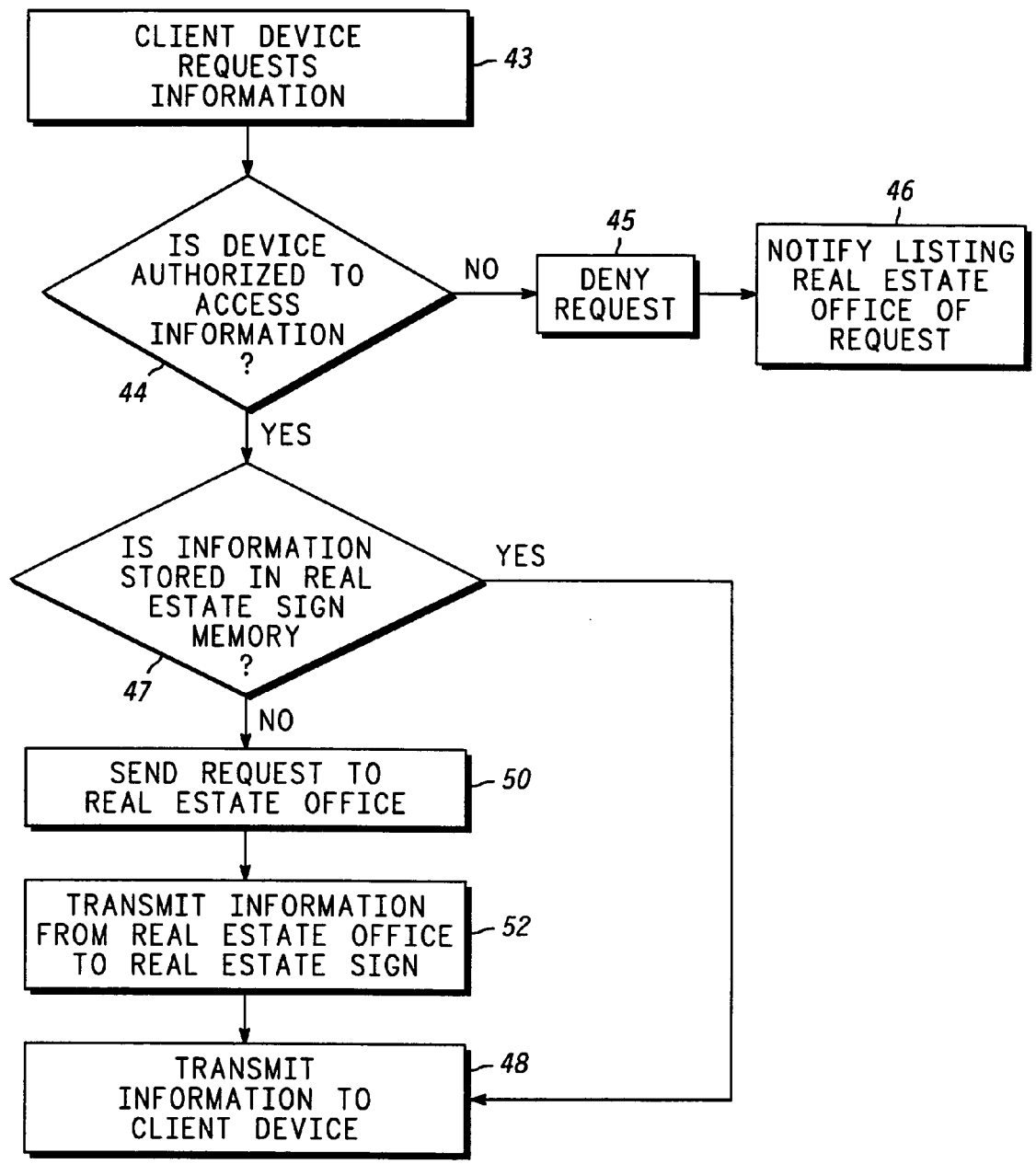
FIG. 3 is a flow chart showing a process by which the real estate sign receives an information request and transmits the requested information according to an embodiment of the present invention.

FIG. 3 is a flow chart showing a process by which the real estate sign receives an information request and transmits the requested information according to an embodiment of the present invention. Referring to FIG. 3, in operation 43, client device 26 or controlling agent device 28 preferably transmits a request for information pertaining to the real estate property. This request can be transmitted to wireless communication system 24 or electronic lock box 25.

From operation 43, the process moves to operation 44, where real estate sign 20 or electronic lock box 25 determines whether the device requesting information is authorized to access the requested information.

If in operation 44 the device requesting information is not authorized to access the requested information, the process moves to operation 45, where a denial is sent to the requesting device signifying that the request for information has been denied by either real estate sign 20 or electronic lock box 25. From operation 45 the process moves to operation 46, where the listing real estate office is notified of the request and the denial from operations 43 through 45.

If in operation 44 the device is authorized to access the requested information, the process moves to operation 47, where it is determined whether the requested information is stored in real estate sign 20 (or electronic lock box 25). If the requested information is stored in real estate sign 20 (or electronic lock box 25), the process moves from operation 47 to operation 48, where the requested information is transmitted to client device 26.

If the requested information is not stored in real estate sign 20 (or electronic lock box 25), the process moves from operation 47 to operation 50, where a request to provide the information is sent to the controlling agent's real estate office.

From operation 50, the process moves to operation 52, where the requested information is transmitted to real estate sign 20 (or electronic lock box 25). From operation 52, the process moves to operation 48, where the requested information is transmitted to client device 26. If the requester's device (client device 26 or controlling agent device 28) is not authorized access to this information (e.g., identity of visitors, incentive payments status, occupant plans to be away from the property, lists of accesses granted/refused, etc.), the request is denied, a message to this effect is transmitted to the requesting device, and a record of the request is transmitted to the controlling agent office for disposition and processing.

It should be understood that this is just one example of a method of requesting and transmitting information from and to client device 26. This operation may be repeated many times while information is exchanged between client device 26 and real estate sign 20 (or electronic lock box 25).

Figure 4:
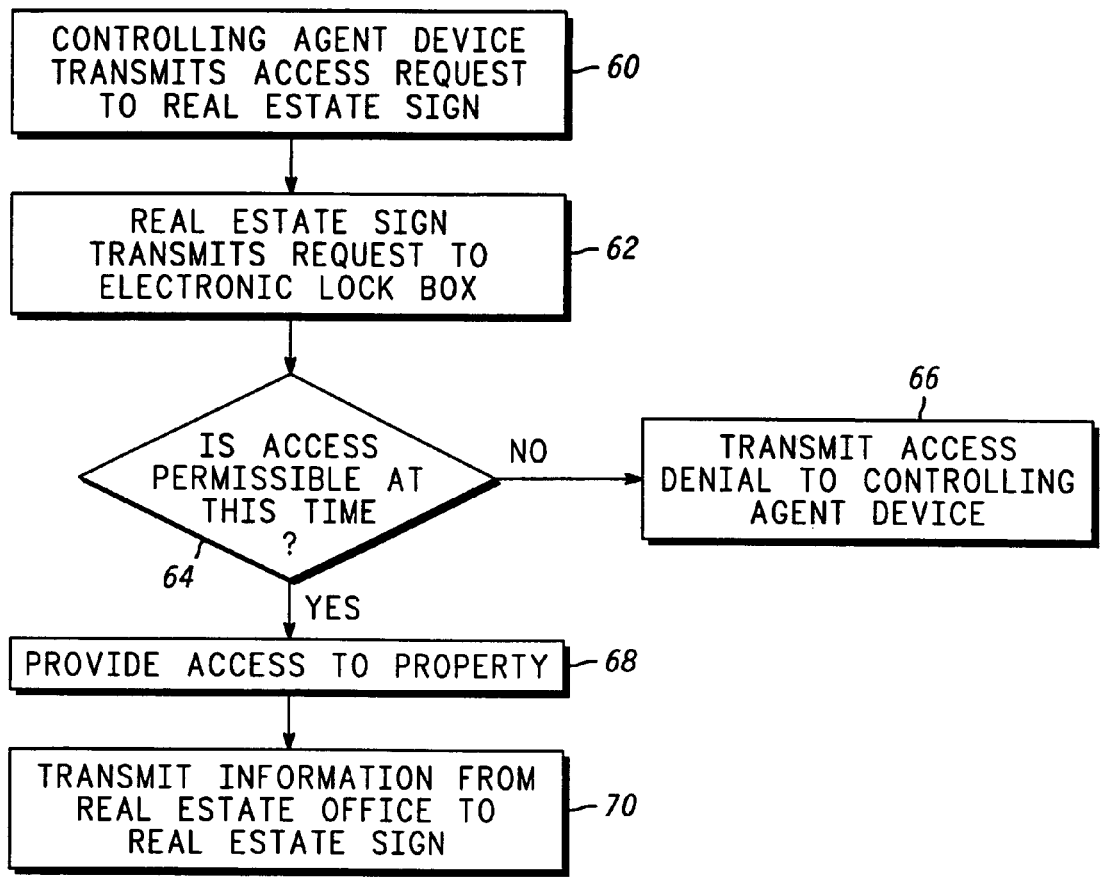
FIG. 4 is a flow chart showing a process in which a controlling agent requests access to the real estate property according to an embodiment of the present invention.

FIG. 4 is a flow chart showing a process in which a client device 26 or controlling agent device 28 requests access to the real estate property according to an embodiment of the present invention. Referring to FIG. 4, in operation 60, a client device 26 or controlling agent device 28, located near the real estate property, transmits a request for access to the real estate property either via real estate sign 20 or electronic lock box 25. It should be noted that controlling agent device 28 may transmit the request directly to electronic lock box 25. However, for the convenience of the requester and the purposes of FIG. 4, controlling agent device 28 may transmit the request from inside a vehicle proximate to the property to the real estate sign 20 which may then relay the request to the electronic lock box 25.

From operation 60, the process moves to operation 62, where real estate sign 20 transmits the access request to electronic lock box 25. As stated above, if the access request is transmitted directly from controlling agent device 28, operation 62 is skipped.

From operation 62, the process moves to operation 64, where it is determined whether access is permissible at the present time. This determination will typically be made in accordance with pre-recorded access rules, which can be set by the owner, occupant, or seller's agent.

If access is not permissible at the present time, the process moves from operation 64 to operation 66, where the refusal to grant access is transmitted to controlling agent device 28. Other information may be transmitted at this time, such as a next available time to enter the property.

If access is permissible at the present time, the process moves from operation 64 to operation 68, where electronic lock box provides access to the real estate property. As stated above, this can be through electronic control of one or more entry points of the real estate property or via a key stored in electronic lock box 25.

Optionally, after operation 68, the process may move to operation 70, where the visit time and/or duration may be recorded.

Figure 5:
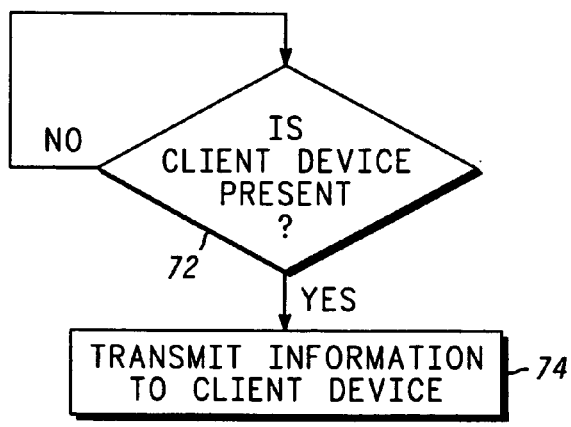
FIG. 5 is a flow chart showing a process for determining whether a configured client device is within a predetermined proximity and for transmitting information to proximate client devices according to an embodiment of the present invention.

FIG. 5 is a flow chart showing a process for determining whether a configured client device is within a predetermined proximity and transmitting information to the client device according to an embodiment of the present invention. According to the process shown in FIG. 5, it is possible for real estate sign 20 (or electronic lock box 25) to "push" information about the real estate property to devices which are within a predetermined proximity of real estate sign 20 (or electronic lock box 25).

Referring to FIG. 5, in operation 72, it is determined whether a client device is within a predetermined proximity of real estate sign 20 (or electronic lock box 25). This proximity is determined by the range of wireless communication provided by real estate sign 20 (or electronic lock box 25).

If in operation 72 a client device is detected, the process moves to operation 74, where information is pushed to client device 26. Such information may be a brief announcement about the real estate property, an invitation to visit the real estate property, or any other information relating to the real estate property. Once a client device is located, any exchange of information such as described above may take place.

As indicated above, wireless communication system 24 is preferably attached or embedded in real estate sign 20. However "embedded" simply indicates that wireless communication system is connected or made a part of real estate sign 20. There may be many methods to embed or attach wireless communication system 24 to real estate sign 20, and the present invention is not limited to any specific manner.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. An apparatus comprising:

an electronic lock box corresponding to a real estate property having a wireless communication system embedded therein for wirelessly receiving, storing and communicating information about the real estate property and controlling access to the real estate property by providing a mechanical or electronic key, the wireless communication system being capable of transmitting the information to a remote device in response to receiving a query for the information from the remote device, wherein the information about the real estate property includes at least one selected from the group comprising a price of the real estate property, a square footage of the real estate property, a virtual tour of the real estate property, a number of bedrooms within the real estate property and an availability of the real estate property.

2. The apparatus as claimed in claim 1, wherein said electronic lock box is hermetically sealed.

3. The apparatus as claimed in claim 1, wherein the electronic lock box is capable of receiving requests and transmitting information about the real estate property to a transmitting/receiving device located within a predetermined proximity of the electronic lock box.

4. The apparatus as claimed in claim 3, wherein the transmitting/receiving device is one of a client configured device and a controlling agent device, the client configured device capable of requesting information about the real estate property from the electronic lock box, transmitting queries about the real estate property to the electronic lock box, transmitting client information to the electronic lock box, transmitting client information to a remote real estate office via the electronic lock box, viewing information received from the electronic lock box or recording voice or text messages in the electronic lock box.

5. The apparatus as claimed in claim 4, wherein the controlling agent device is capable of performing all client configured device functions and is further capable of at least enabling, programming and disabling the electronic lock box, overriding access restrictions of the electronic lock box, viewing information stored by the electronic lock box, downloading information stand by the electronic lock box, interacting with other premises electronic equipment, and maintaining the electronic lock box.

6. The apparatus as claimed in claim 1, wherein the electronic lock box is capable of holding at least one key therein.

7. The apparatus as claimed in claim 1, wherein the electronic lock box comprises at least one of the group consisting of a memory, a proximity device reader, a display, a clock and an alarm.

8. The apparatus as claimed in claim 7, wherein the electronic lock box is capable of storing at least one of a group comprising a time of a visit to the real estate property, a duration of the visit to the real estate property, an identity of a person who visited the real estate property and comments and/or suggestions form the person who visited the real estate property.

9. The apparatus as claimed in claim 7, wherein the electronic lock box can communicate via network to a controlling real estate office, the controlling real estate office transmitting a control signal to the electronic lock box to permit access to the real estate property.

10. The apparatus as claimed in claim 7, wherein the electronic lock box is capable of recording an attempt to gain access to the real estate property.

11. The apparatus as claimed in claim 7, wherein the electronic lock box can restrict access to the real estate property based upon communicated entry rules.

12. A real estate system comprising:

an electronic lock box having a wireless communication system embedded therein located within a predetermined proximity of a real estate property and controlling access to real estate property by providing a mechanical or electronic key, the electronic lock box being capable of wirelessly receiving, storing and communicating information about the real estate property; and a transmitting/receiving device configured to transmit a query for the information about the real estate property to the electronic lock box and receive the information from the electronic lock box in response to query, wherein the information about the real estate property includes at least one selected from the group comprising a price of the real estate property, a square footage of the real estate property, a virtual tour of the real estate property, a number of bedrooms within the real estate property and an availability of the real estate property.

13. A method of marketing a real estate property comprising:

providing an electronic lock box within a predetermined proximity of the real estate property for controlling access to the real estate property by releasing a mechanical or electronic key;

receiving by the electronic lockbox information about the real estate property;

storing the information about the real estate property in the electronic lockbox;

receiving, by the electronic lock box, a query about the real estate property from a transmitting/receiving device; and transmitting the information about the real estate property from the electronic lock box to the transmitting/receiving device in response to receiving the query, wherein the information about the real estate property includes at least one selected from the group comprising a price of the real estate property, a square footage of the real estate property, a virtual tour of the real estate property, a number of bedrooms within the real estate property and an availability of the real estate property.

* * * * *